G. J. LOWRES.
EYEGLASS MOUNTING.
APPLICATION FILED SEPT. 29, 1909.
1,001,156.
Patented Aug. 22, 1911.
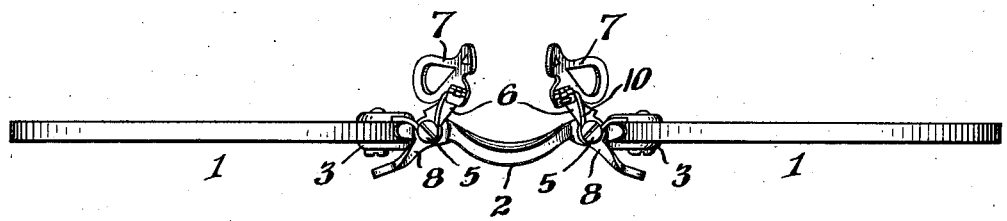
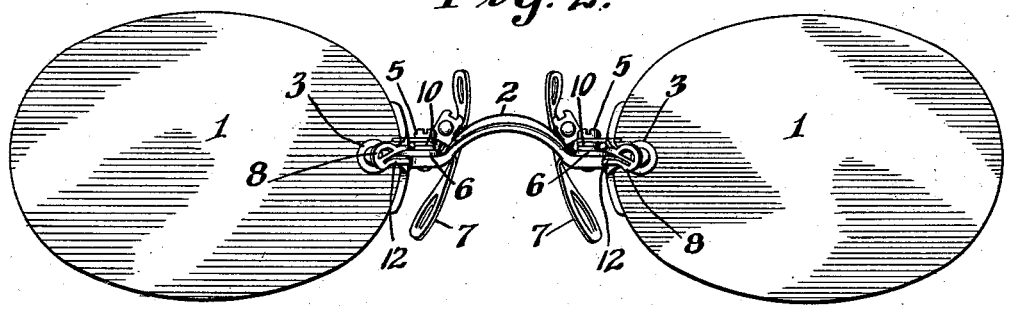
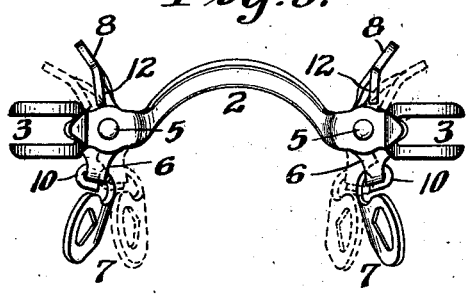
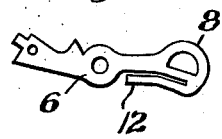
Witnesses
Daniel Webster, Jr.
Carrie E. Kleinfelder.
Inventor
George J. Lowres
By Cyrus N. Anderson
Attorney

UNITED STATES PATENT OFFICE.

GEORGE J. LOWRES, OF NEWARK, NEW JERSEY, ASSIGNOR TO LOWRES OPTICAL COMPANY, A CORPORATION OF NEW JERSEY.

EYEGLASS-MOUNTING.

1,001,156.  Specification of Letters Patent.  Patented Aug. 22, 1911.

Application filed September 29, 1909. Serial No. 520,145.

*To all whom it may concern:*

Be it known that I, GEORGE J. LOWRES, a citizen of the United States, residing in the city of Newark, county of Essex, State of New Jersey, have invented certain new and useful Improvements in Eyeglass-Mountings, of which the following is a specification.

My invention relates to an improvement in eye glass mountings and particularly to the class of mountings in which the nose pieces are supported upon spring actuated levers. The action of the springs in mountings of this character causes the nose pieces to press against the opposite sides of the nose and hold the glasses in position. One of the objections which has been noted in eye glasses of this construction is that the constant and continued pressure of the nose pieces against the nose caused by the spring is apt to cause the nose pieces to cut into the flesh of the wearer and cause soreness.

The object of my invention is to provide means to limit the inward movement of the nose pieces, that is to say, the movement toward the nose, and thus limit the pressure of the nose pieces against the nose.

In the accompanying drawings I have shown a convenient embodiment of the means employed by me for overcoming the objection previously noted. It will be understood, however, that changes in the details of construction and in the specific means employed for accomplishing this result may be made without departing from my invention.

In the drawings:—Figure 1 is a top plan view of a pair of eye glasses embodying my invention; Fig. 2 is a front elevation of the same; Fig. 3 is a top plan view of the mounting shown in Figs. 1 and 2 provided with my invention; and Fig. 4 is a view of a blank employed in the making of the levers which support the nose pieces.

Referring to the drawings:—1 designates the lenses of a pair of eye glasses, and 2 designates the bridge to which, at its opposite ends, the lenses are connected by means of straps 3 or by any other means which may be preferred.

While I have illustrated my invention as employed in connection with a pair of rimless eye glasses, it will be understood that the same may be used in connection with eye glasses having rims or otherwise constructed.

5 designates pins or pivots secured to the opposite end portions of the bridge 2 and in the construction shown the said pins or pivots stand, though not necessarily so, in the plane of the lenses. 6 designates levers pivoted to the said pins to which the nose bearing parts 7 are connected. These parts may be formed integrally with the said levers or they may be made separately and connected thereto in any manner found to be desirable. In the construction shown, the nose pieces are made separately and are pivotally secured to the rear ends of the said levers in the manner shown.

8 designates forwardly projecting arms which are clasped usually between a finger and thumb when it is desired to separate the nose pieces to place the eye glasses upon the nose. The nose pieces are held inwardly by the action of springs 10 which are coiled about the pins 5 and each of which has one end in contact or engagement with a lever 6 and the other end in contact with some other portion of the mounting or the lenses. The position and action of the springs are most clearly shown in Fig. 1 of the drawings.

As thus far described, I have not referred to any means to limit the inward movement of the nose bearing parts 7, that is to say, a movement of said parts toward each other. To limit such inward movement and therefore limit the pressure exerted by the nose bearing parts upon the nose, I have provided a stop 12 which is adapted to engage some relatively stationary portion of the mounting or the lenses. In the construction shown, the stop 12 consists of an integral portion of the forwardly projecting arm 8 of the lever 6. The said parts 12 are separated from the main portions of the said arms by a cut as clearly shown in Fig. 4 of the drawings. These stops 12 may be bent and adjusted to a greater or less extent as indicated in Fig. 3 so as to vary the limit of inward movement of the levers 6 to provide for the various adjustments necessary to fit noses of different thicknesses and shapes. In the construction shown the stops 12 are adapted to rest or abut against the straps 3. They may, however, be adapted to rest or abut against any other relatively stationary portion of the eye glasses. Furthermore any other suitable means may be employed or interposed between the said lever 6 or the forwardly projecting arms 8 and some relatively stationary portion of the eye glass mounting or lenses to effect or accomplish the same result. I do not desire to be limited to the precise construction or means shown for accomplishing the desired result.

Broadly speaking, my invention comprehends means interposed between the nose bearing portions and some other portion of the mounting or the lenses and operating to limit the inward movement of the nose bearing portions and thus limiting and controlling the pressure of the said nose bearing portions against the nose.

More specifically, my invention comprehends the interposition of means between the levers supporting the nose bearing portions and some relatively stationary portion of the mounting or the lenses to limit and control the inward movement of the nose bearing portions for the purpose stated.

Having thus described my invention, I claim:—

1. In eye glasses, in combination, lenses, a bridge connecting the said lenses, levers pivotally supported upon the opposite end portions of the said bridge and carrying nose bearing portions, springs actuating the said levers to hold the nose bearing portions inwardly and adjustable means interposed between the said levers and portions of the mounting for the lenses to limit the inward movement of the said levers and the nose bearing portions carried thereby and thus control the pressure exerted by the said nose bearing portions upon the nose.

2. In eye glasses, in combination, lenses, a bridge connecting the lenses, levers pivoted to the said bridge and carrying nose bearing portions upon their rear ends and the said levers having forwardly projecting arms provided with adjustable stops which are adapted to engage portions of the mounting or the lenses to limit the inward pivotal movement of the said levers and thus limit the movement of the nose bearing portions toward each other, and springs operating to cause inward movement of said levers and of the said nose bearing portions.

3. In eye glasses, in combination, lenses, a bridge connecting the said lenses, levers pivotally connected to the said bridge and carrying nose bearing portions and having forwardly projecting operating arms, the said arms being provided with integral adjustable stops, the said stops being formed by partially cutting away a portion of the material of the said arms and the said stops being adapted to contact with portions of the mounting or the lenses to limit the inward movement of the said levers and of the said nose bearing portions, and springs operating to cause movement of the said nose bearing portions inwardly or toward each other.

In testimony that I claim the foregoing as my invention, I have hereunto signed my name this 24th day of September, A. D. 1909.

GEORGE J. LOWRES.

In the presence of—
HENRY HAHN,
BENJ. NEWMAN.

---

Copies of this patent may be obtained for five cents each, by addressing the "Commissioner of Patents, Washington, D. C."